United States Patent [19]

Nakata et al.

[11] 4,297,477

[45] Oct. 27, 1981

[54] POLYAMIDE HAVING —NH—(CH₂)₄—CH(NRR')—CO—UNITS

[75] Inventors: Minoru Nakata, Suzuka; Haruyo Sato; Shinzo Imamura, both of Nagoya, all of Japan

[73] Assignee: Toray Industries, Incorporated, Tokyo, Japan

[21] Appl. No.: 108,941

[22] Filed: Dec. 31, 1979

[30] Foreign Application Priority Data

Jan. 5, 1979 [JP] Japan .................................. 54-856
Jan. 5, 1979 [JP] Japan .................................. 54-857
Jan. 5, 1979 [JP] Japan .................................. 54-858

[51] Int. Cl.³ .................................................. C08G 69/14
[52] U.S. Cl. ................................. 528/323; 528/312; 528/319; 528/325; 528/328; 528/329
[58] Field of Search ............... 528/328, 323, 325, 329, 528/326

[56] References Cited

U.S. PATENT DOCUMENTS 3,907,755 9/1975 Margraff et al. ..................... 528/328

*Primary Examiner*—Harold D. Anderson
*Attorney, Agent, or Firm*—Scully, Scott, Murphy & Presser

[57] ABSTRACT

Provided are polyamides having properties which make them useful as adhesives, sizing agents, paper strength enhancers and as resins. These polyamides are prepared by heating an alpha-(N,N-disubstituted amino)-E-caprolactam, alone or in combination with one or more comonomers, in the presence of an anionic polymerization catalyst, and are characterized by a repeating unit reprsented by the formula

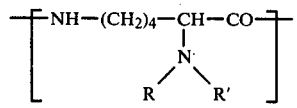

wherein R and R' are each a lower alkyl group or a cyclic amine residue, and also having a relative viscosity of at leasrt 1.5.

7 Claims, No Drawings

POLYAMIDE HAVING
—NH—(CH$_2$)$_4$—CH(NRR')—CO—UNITS

This invention relates to polyamides and more particularly to new basic polyamides and process for preparing same.

Polyamides, especially polymers of poly-ε-capramide, have excellent strength, wear resistance and dyeing property, and have been used widely for fibers, films and injection moldings. For use in various other applications, moreover, such poly-ε-capramide are used in the form of copolymers or after addition of various additives.

In the preparation of poly-ε-capramides having a substituent group, the reactivity of the substituent group often makes polymerization difficult.

For example, a polymer of α-amino-ε-caprolactam is not known yet, but this is presumed ascribable to the fact that an attempt to polymerize α-amino-ε-caprolactam under the ordinary polymerization conditions for ε-caprolactam results in gelation due to reaction of the α-amino group.

It is an object of this invention to provide new polyamides.

It is another object of this invention to provide caprolactam series basic polymers having a high utility and excellent characteristics.

It is a further object of this invention to provide a process for preparing such polyamides.

Other objects and advantages of this invention will become apparent from the following description.

According to this invention there are provided basic polyamides having a repeating unit represented by the formula I

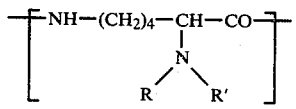

wherein R and R' are each a loweralkyl group or a cyclic amine residue, and also having a relative viscosity of at least 1.5.

Also according to this invention there are provided basic polyamides consisting essentially of the repeating unit of the formula I and the repeating unit of the following formula II

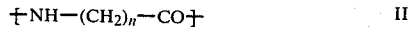

wherein n is an integer of 3 to 11, and having a relative viscosity of at least 1.5.

According to this invention, moreover, there is provided a process for preparing a basic polyamide by polymerizing the corresponding lactam compound or compounds using an anionic polymerization catalyst.

The basic polyamide of this invention essentially has the repeating unit of the formula I and a relative viscosity of at least 1.5.

The "relative viscosity" as referred to herein indicates a relative viscosity, measured at 25° C., of a solution of the polyamide of this invention dissolved at a concentration of 1 g/100 ml in 98% sulfuric acid as solvent.

The relative viscosity of the polyamide of the invention should be not lower than 1.5, but preferably it is in the range of from 2 to 5.

The main chain of the polyamide of the invention consists essentially of the repeating unit of the formula I alone or in combination with other repeating unit. In the case of a copolyamide containing such other repeating unit, it is preferable that at least 10 mol% of the main chain thereof consist of the repeating unit of the formula I. In the formula I,

represents a residue of an amine, R and R' are the same or different lower alkyl groups or cyclic amine residues. Examples of lower alkyl are methyl, ethyl, propyl and butyl.

may also represent a residue of cyclic amine such as a pyrrolidino, piperidino and morpholino. The carbon number of

may be 2 to 8. In other words, in cyclic amine residues R and R' conjointly constitute a lower alkylene which may contain in the main chain thereof such heteroatoms as oxygen and nitrogen. Above all, polyamides wherein both R and R' are methyl, are preferred.

In the case of the foregoing copolyamide, it is preferable that not less than 10 mol% of the repeating unit of the formula I and not more than 90 mol% of the repeating unit of the formula II be combined. Especially when the repeating unit of the formula I is existent not less than 20 mol%, the copolyamide concerned exhibits its feature more remarkably. In the formula II, n is an integer of 3 to 11, but 5 to 11 is preferable and 5 is most preferable.

Preferably, the polyamide of this invention is prepared by heating an α-(N,N-disubstituted amino)-ε-caprolactam represented by the following formula III

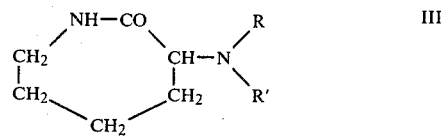

wherein R and R' are as previously defined, alone or in combination with one or more comonomers, in the presence of an anionic polymerization catalyst.

By way of illustrating the α-(N,N-disubstituted amino)-ε-caprolactams of the formula III, mention may be made of the following: α-(N,N-dimethylamino)-ε-caprolactam, α-(N,N-diethylamino)-ε-caprolactam, α-(N,N-dipropylamino)-ε-caprolactam, α-(N,N- dibutylamino)-ε-caprolactam, α-(N,N-methylethylamino)-ε-caprolactam, α-(N,N-methylpropylamino)-ε-caprolactam, α-(N,N-methylbutylamino)-ε-caprolactam, α-(N,N-ethylpropylamino)-ε-caprolactam, α-(N,N-ethylbutylamino)-ε-caprolactam, α-(N,N-propylbutylamino)-ε-caprolactam, α-pyrrolidino-ε-caprolactam, α-piperidino-ε-caprolactam, α-morpholino-ε-caprolactam.

Preferred comonomers are cyclic amides or lactams represented by the following formula IV

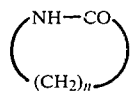   IV wherein n is as previously defined. Examples are α-pyrrolidone, α-piperidone, ε-caprolactam, and δ-laurolactam. In their copolymerization it is preferable that there be used not less than 10 mol% of an α-(N,N-disubstituted amino)-ε-caprolactam represented by the formula III and not more than 90 mol% of at least one of the cyclic amides of the formula IV.

α-(N,N-dimethylamino)-ε-caprolactam, one of the starting materials used in this invention, can be prepared for example by adding nitrosyl chloride to cyclohexene to give bis(1-nitroso-2-chlorocyclohexane), reacting the latter with excess ammonia to form α-amino-cyclohexanone oxime, subjecting a hydrochloride thereof to Beckmann rearrangement with sulfuric acid to prepare α-amino-ε-caprolactam and then dimethylating the latter with methyl bromide.

The catalyst used in the polymerization reaction of this invention is an anionic polymerization catalyst. By way of illustration, the following basic catalysts may be mentioned as typical examples: alkali metals and alkaline earth metals such as lithium, sodium, potassium, magnesium, calcium and strontium, and basic compounds thereof such as their hydride, borohydride, oxide, hydroxide and carbonate, as well as organometallic compounds such as butyllithium, ethylpotassium, propylsodium, phenylsodium, triphenylmethylsodium, diphenylmagnesium, diethylzinc, triethylaluminum, triisopropylaluminum, diisobutylaluminum hydride, sodium amide, magnesium amide and magnesium anilide, and further Grignard reagents such as ethylmagnesium chloride, methylmagnesium bromide and phenylmagnesium bromide. Specially preferred are metallic lithium, metallic sodium, metallic potassium, triethylaluminum and diethylzinc.

Also, there may be used promotors as necessary. Generally used as anionic polymerization promotors are N-acetyl-ε-caprolactam, N-phenylphthalimide, N,N'-di(phenylcarbamyl)-N,N'-dimethylurea, and N,N-diacetylmethylamine. The amount of catalyst and promotor to be added is preferably in the range of from 1/20 mol to 1/500 mol per mol of monomer. With their amount larger than 1/20 mol, the polymerization degree of the resulting polymer will be decreased to a remarkable extent and coloring will increase, while in the case of their amount being smaller than 1/500 mol the polymerization velocity will be decreased remarkably or sometimes polymerization will not take place at all.

The polymerization reaction in this invention is carried out under an inert gas stream or under reduced pressure. The polymerization temperature is preferably in the range of from 150° C. to 250° C. Polymerization temperatures lower than 150° C. are not practical because the polymerization velocity would become very low, while at higher temperatures than 250° C. the thermal decomposition of α-(N,N-disubstituted amino)-ε-caprolactam will be promoted and the degree of polymerization rather tends to decrease. The polymerization is continued for several minutes to several hours. Before, during or at the end of the polymerization there may be added additives such as pigments, weatherproofing agents, heat-proofing agents and antioxidants.

The polyamide of this invention prepared as above exhibits a correspondingly increasing solubility in water, organic solvents and acid solutions as the proportion of the repeating unit of the formula I increases.

A polyamide consisting essentially of the repeating unit of the formula I is easily soluble in alcohols such as methanol, ethanol and n-propanol and in solvents such as chloroform, trichloroethane and carbon tetrachloride, swells in benzene, is insoluble in cyclohexane and is easily soluble in cold water but difficult to dissolve in hot water at a temperature higher than 50° C. An aqueous solution of this polyamide exhibits a basic property and is neutralized with an acid of 0.0064 molar equivalent per gram of the polymer. Salts of the polymer neutralized with mineral acids such as hydrochloric acid, sulfuric acid and phosphoric acid, organic acids such as formic acid, acetic acid, benzoic acid, adipic acid, sebacic acid and terephthalic acid, or polyacrylic acid, become more easily soluble in both cold and hot waters. A solution of the polyamide dissolved in solvent is almost transparent and viscous. If the solution is applied thin and the solvent evaporated, a film-like formed article results. The polyamide of this invention, moreover, is hygroscopic and when it absorbs moisture the polymer surface becomes sticky.

The new basic polyamide of this invention is useful as an adhesive, a sizing agent, a coating agent, a paper strength enhancer and as resin for a printing plate.

Working examples of this invention are given below.

EXAMPLE 1

15.6 g. of α-(N,N-dimethylamino)-ε-caprolactam dried to a moisture content not higher than 0.02% was melted at 100° C. in a nitrogen gas stream, in which were then dissolved 0.023 g. of metallic sodium and 0.155 g. of N-acetyl-ε-caprolactam.

In the same way there were prepared three reaction systems in all, which were allowed to polymerize at 180° C. for 0.5 hour, 1 hour and 6 hours, respectively, to give transparent, light yellow polymers (A), (B) and (C) of the α-(N,N-dimethylamino)-ε-caprolactam. The relative viscosities of the polymers (A), (B) and (C) were 2.95, 3.06 and 3.18, respectively. The following are the results of analysis of the polymer (B).

| Elemental Analysis | as $(C_8H_{16}N_2O)_n$ |
|---|---|
| Calculated | C: 61.50% H: 10.32% N: 17.93% |
| Found | C: 60.9% H: 10.83% N: 17.80% |
| Softening point | 108–119° C. |
| Percent moisture absorption in 70% RH at 30° C. | 20.2% |
| Infrared absorption specturm (IR) main peak | 3300, 2950, 1660, 1560, 1460, 1260, 1040 $CM^{-1}$ |
| Nuclear magnetic resonance spectrum | |

| | |
|---|---|
| -continued | |
| (NMR) main peak | 1.5, 2.2, 2.7, 3.2, 7.0, 7.2 ppm |

The polymers (A) and (C) were also measured for softening point, elemental analysis, IR, and NMR, the results of which were the same as in the case of the polymer (B).

EXAMPLE 2

10 g. of the α-(N,N-dimethylamino)-ε-caprolactam polymer (B) prepared in Example 1 was dissolved in 100 ml of each of the solvents shown in Table 1 below and the dissolving state was observed with the naked eye, the results of which are shown in the same table.

TABLE 1

| Solvent | Dissolving temp. (°C.) | Dissolving State |
|---|---|---|
| Water | 20 | Dissolved transparent |
| " | 50 | " |
| " | 60 | Polymer deposited |
| Methanol | 20 | Dissolved transparent |
| " | 60 | " |
| Ethanol | 20 | " |
| Chloroform | 20 | " |
| Trichlene | 20 | " |
| Carbon tetrachloride | 20 | " |
| Benzene | 20 | Polymer swollen |
| Cyclohexane | 20 | Insolubel |

EXAMPLE 3

The α-(N,N-dimethylamino)-ε-caprolactam polymer (B) prepared in Example 1 was weighed out 0.755 g., into which was then added 30 ml of distilled water to allow the polymer to dissolve therein. Thereafter, the polymer solution was subjected to neutralization titration with a 1 N hydrochloric acid solution. The pH at the equivalence point of neutralization was 3.7, and the titration amount of hydrochloric acid was 0.0064 molar equivalent per gram of the polymer.

EXAMPLE 4

15.6 g. of an α-(N,N-dimethylamino)-ε-caprolactam dried to a moisture content not higher than 0.02% was melted at 100° C. in a nitrogen gas stream, in which were then dissolved 0.023 g. of metallic sodium and 0.155 g. of N-acetyl-ε-caprolactam. Separately, 11.3 g. of ε-caprolactam was melted at 100° C. in a nitrogen gas stream, in which were dissolved 0.023 g. of metallic sodium and 0.155 g. of N-acetyl-ε-caprolactam. Both were then mixed together and polymerized under heating at 180° C. for 60 minutes to give a transparent, light yellow copolymer of 1:1 mol of the α-(N,N-dimethylamino)-ε-caprolactam and ε-caprolactam.

Elemental Analysis: Calculated: C: 62.42%; H: 10.10%; N: 15.60%. Found: C: 62.23%; H: 10.37%; N: 15.55%.

Softening point: 75°–86° C.

$\eta r$: 2.91.

IR main peak: 3300, 2950, 1660, 1560, 1460, 1260, 1040 $CM^{-1}$.

EXAMPLE 5

Monomer mixtures of α-(N,N-dimethylamino)-ε-caprolactam and ε-caprolactam at mixing mol ratios of 20:80, 40:60, 58:42, and 79:21, respectively, were copolymerized under the same polymerization conditions as in Example 4. The resulting copolymers were all transparent and light yellow. The $\eta r$ and softening point of these copolymers were determined. Furthermore, these copolymers were each dissolved in a mixed solvent of 80 parts phenol and 20 parts ethyl alcohol and subjected to neutralization titration with 1/10 N hydrochloric acid, then the amount of hydrochloric acid required for neutralization per unit weight of the copolymer was determined in terms of basicity. The results of these measurements, as well as that of IR and elementary analysis, are as shown in Table 2 below.

TABLE 2

| Copolymer | Monomer ratio in mol of copolymer | | $\eta r$ | Softening Point (°C.) | Basicity (equivalent /g) | IR Main Absorption Peak ($CM^{-1}$) | Elemental Analysis, % (parenthesized are theoretical values) | | |
|---|---|---|---|---|---|---|---|---|---|
| | α-(N,N-dimethylamino)-ε-caprolactam | ε-caprolactam | | | | | C | H | N |
| D | 20 | 80 | 2.86 | 185–193 | 0.00171 | 3300, 2950, 1660, 1560, 1460, 1260, 1040 | 63.03 (63.12) | 9.99 (9.93) | 13.71 (13.80) |
| E | 40 | 60 | 2.82 | 94–106 | 0.00309 | 3300, 2950, 1660, 1560, 1460, 1260, 1040 | 62.54 (62.64) | 10.10 (10.05) | 15.02 (15.03) |
| F | 58 | 42 | 2.91 | 58–69 | 0.00429 | 3300, 2950, 1660, 1560, 1460, 1260, 1040 | 62.20 (62.25) | 10.40 (10.14) | 15.97 (16.02) |
| G | 79 | 21 | 2.95 | 88–97 | 0.00544 | 3300, 2950, 1660, 1560, 1460, 1260, 1040 | 61.55 (61.86) | 10.45 (10.24) | 16.92 (17.04) |

EXAMPLE 6

The solubility in water and ethyl alcohol of the copolymers prepared in Example 5 (at a concentration of 10 g copolymer/100 ml solvent) was as shown in Table 3.

TABLE 3

| Monomer ratio in mol of copolymer | | Solubility | | | |
|---|---|---|---|---|---|
| α(N,N-dimethylamino)-ε-caprolactam | ε-caprolactam | Cold Water | Hot Water | Cold ethyl alcohol | Hot ethyl alcohol |
| 20 | 80 | Insoluble | Insoluble | Swelled | Swelled |
| 40 | 60 | Swelled | Whitely turbid | Dissolved | Dissolved |
| 58 | 42 | Disolved | Insoluble | " | " |

TABLE 3-continued

| Monomer ratio in mol of copolymer | | Solubility | | | |
|---|---|---|---|---|---|
| α(N,N-dimethyl-amino)-ε-capro-lactam | ε-caprolactam | Cold Wateq | Hot Wateq | Cold ethyl alcohol | Hot ethyl alcohol |
| 79 | 21 | " | " | " | " |

EXAMPLE 7;

dried to a moisture content not higher than 0.02% was melted at 100° C. in a nitrogen gas stream, in which were then dissolved 0.023 g. of metallic sodium and 0.155 g. of N-acetyl-ε-caprolactam. Separately, 19.7 g. of ω-laurolactam was melted at 165° C. in a nitrogen gas stream, in which were dissolved 0.023 g. of metallic sodium and 0.155 g. of N-acetyl-ε-caprolactam. Both were then mixed together and polymerized under heating at 230° C. for 120 minutes to give a transparent, light yellow copolymer of 1:1 mol of the α-(N,N-dimethylamino)-ε-caprolactam and ω-laurolactam.

Elemental Analysis: Calculated: C: 67.94%; H: 11.12%; N: 11.89%. Found: C: 67.51%; H: 11.39%; N: 67.46%.

Softening point: 62°–75° C.

ηr: 2.71.

What is claimed is:

1. A basic polyamide having a repeating unit represented by the formula:

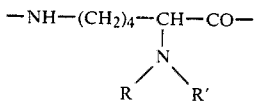

wherein R and R' each is a lower alkyl group having 1 to 4 carbon atoms, and having a relative viscosity of at least 1.5 measured at 25° C. in a solution of said basic polyamide at a concentration of 1 gr/100 ml. in a 98% sulfuric acid solvent.

2. The basic polyamide as defined in claim 1, in which both R and R' are methyl.

3. A basic polyamide having a repeating unit represented by the formula:

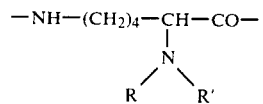

wherein R and R' each is a lower alkyl group having 1 to 4 carbon atoms, and a repeating unit represented by the formula

wherein n is an integer of 3 to 11, and having a relative viscosity of at least 1.5 measured at 25° C. in a solution of said basic polyamide at a concentration of 1 gr/100 ml. in a 98% sulfuric acid solvent.

4. A basic polyamide as defined in claim 3, in which at least 10 mol% of the main polymer chain consists of the repeating unit represented by the formula

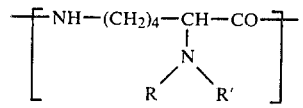

5. The basic polyamide as defined in claim 3, in which both R and R' are methyl.

6. The basic polyamide as defined in claim 3, in which both R and R' are methyl and n is 5.

7. The basic polyamide as defined in claim 3, in which both R and R' are methyl and n is 11.

* * * * *